(12) United States Patent
Peng et al.

(10) Patent No.: US 10,081,945 B2
(45) Date of Patent: Sep. 25, 2018

(54) WHITE AND BLACK PLY LAMINATE

(71) Applicant: JOHNS MANVILLE, Denver, CO (US)

(72) Inventors: Lichih R Peng, Littleton, CO (US); Zebonie Sukle, Denver, CO (US); Jordan Kortmeyer, Parker, CO (US); Thomas Justin Stock, Westminster, CO (US)

(73) Assignee: Johns Manville, Denver, CO (US)

( * ) Notice: Subject to any disclaimer, the term of this patent is extended or adjusted under 35 U.S.C. 154(b) by 280 days.

(21) Appl. No.: 14/157,106

(22) Filed: Jan. 16, 2014

(65) Prior Publication Data

US 2014/0154449 A1 Jun. 5, 2014

Related U.S. Application Data

(62) Division of application No. 13/706,017, filed on Dec. 5, 2012, now Pat. No. 8,663,413.

(51) Int. Cl.
| | |
|---|---|
| *E04D 11/00* | (2006.01) |
| *B32B 37/15* | (2006.01) |
| *E04D 5/10* | (2006.01) |
| *E04D 5/06* | (2006.01) |

(52) U.S. Cl.
CPC ............ *E04D 11/00* (2013.01); *B32B 37/153* (2013.01); *E04D 5/06* (2013.01); *E04D 5/10* (2013.01); *B32B 2419/06* (2013.01); *Y10T 428/1452* (2015.01); *Y10T 428/24967* (2015.01)

(58) Field of Classification Search
CPC .... E04D 5/10; E04D 5/06; E04D 5/12; E04D 5/14; E04D 5/141; E04D 5/142; E04D 5/143; E04D 5/148; E04D 5/149; B32B 37/153
See application file for complete search history.

(56) References Cited

U.S. PATENT DOCUMENTS

| | | | |
|---|---|---|---|
| 5,204,148 A * | 4/1993 | Alexander | E04D 5/145 428/141 |
| 6,863,944 B2 * | 3/2005 | Naipawer, III | C09J 7/0246 428/147 |
| 7,368,155 B2 * | 5/2008 | Larson | E04D 5/10 428/141 |

(Continued)

FOREIGN PATENT DOCUMENTS

| | | |
|---|---|---|
| EP | 0 922 566 A2 | 6/1999 |
| EP | 1 243 716 A1 | 9/2002 |

*Primary Examiner* — Scott R. Walshon
(74) *Attorney, Agent, or Firm* — Robert D. Touslee

(57) ABSTRACT

According to one embodiment, a roofing membrane laminate includes a first layer of an uncured ethylene propylene diene monomer rubber (EPDM) material and a second layer of a thermoplastic polyolefin (TPO) material coupled with the EPDM material. The EPDM material has a thickness of between about 50 mils and 70 mils and the TPO material has a thickness of between about 15 mils and 35 mils. The EPDM material and TPO material are coupled via crosslinking of the TPO and EPDM material at an interface thereof, whereby at least a top portion of the EPDM material is cured via the application of heat after the EPDM material and TPO material are placed into contact so as to effect crosslinking of the materials.

8 Claims, 5 Drawing Sheets

(56) References Cited

U.S. PATENT DOCUMENTS

| | | | |
|---|---|---|---|
| 7,641,964 B2 * | 1/2010 | Swei | B32B 27/08 |
| | | | 428/215 |
| 7,882,671 B2 * | 2/2011 | Bruce | B32B 27/12 |
| | | | 264/173.11 |
| 2001/0003625 A1 | 6/2001 | Apgar et al. | |
| 2003/0054127 A1 * | 3/2003 | Heifetz | B29C 63/0017 |
| | | | 428/40.1 |
| 2004/0033741 A1 | 2/2004 | Peng | |
| 2004/0244315 A1 * | 12/2004 | Rust | E04D 3/366 |
| | | | 52/198 |
| 2006/0151108 A1 | 7/2006 | St. Denis et al. | |
| 2007/0194482 A1 | 8/2007 | Douglas et al. | |
| 2008/0248241 A1 * | 10/2008 | Kalkanoglu | B32B 11/10 |
| | | | 428/141 |
| 2009/0100775 A1 * | 4/2009 | Trial | E04D 5/10 |
| | | | 52/408 |

\* cited by examiner

WHITE AND BLACK PLY LAMINATE

CROSS-REFERENCES TO RELATED APPLICATIONS

This application is a divisional of and claims priority to U.S. patent application Ser. No. 13/706,017, filed Dec. 5, 2012, now U.S. Pat. No. 8,663,413, issued Mar. 4, 2014, entitled "White and Black Ply Laminate and Methods", which is hereby incorporated by reference in its entirety for all purposes.

BACKGROUND OF THE INVENTION

Roofing membranes are commonly used for roofing systems of building and structures. Roofing membranes are often applied to the building or structure's roof to prevent leaks and/or to provide aesthetic appeal. Roofing membranes are commonly made of various synthetic rubber materials, modified bitumen, or thermoplastic materials.

Two common types of roofing membrane include those made of thermoplastic polyolefin (TPO) and those made of ethylene propylene diene monomer rubber (EPDM). TPO membranes are often white, but may be made in various other colors or shades, such as grey, black, and the like. Similarly, EPDM membranes are often black, but in some embodiments may also be white. White roofing membranes are often used to provide a pleasing appeal to the building and/or to reflect radiation and minimize heat island effects. White EPDM membranes are often expensive due to the white pigment used and/or other fillers that are added to the membrane. EPDM membranes may also be prone to degradation from one or more environmental factors. TPO membranes are often more rigid than EPDM membranes.

BRIEF SUMMARY OF THE INVENTION

The embodiments described herein provide a laminate that includes a TPO top material or layer and an EPDM bottom material or layer. According to one embodiment, a method of making a roofing membrane is provided. According to the method, an ethylene propylene diene monomer rubber (EPDM) material sheet is provided and a thermoplastic polyolefin (TPO) material sheet is extruded onto the EPDM material sheet. The EPDM material sheet and TPO material sheet are then pressed together via one or more rollers. The EPDM material is typically uncured and may have a thickness of between about 50 mils and 70 mils. The extruded TPO sheet may have a temperature of at least 150 degrees Celsius, and more commonly about 200 degrees Celsius, and a thickness of between about 15 mils and 35 mils. The heat of the TPO material sheet may cause a top portion of the EPDM material sheet to cure such that crosslinking of the TPO and EPDM material sheets occurs at an interface of the sheets to bond the sheets together. In some embodiments, a fiber mat or film may be positioned between the TPO material sheet and the EPDM material sheet, or adjacent a bottom surface of the EPDM sheet.

According to another embodiment, a roofing membrane laminate is provided. The roofing membrane laminate may include a first layer of an ethylene propylene diene monomer rubber (EPDM) material. At least a portion of the EPDM material may be uncured and the EPDM material may have a thickness of between about 50 mils and 70 mils. The roofing membrane laminate may also include a second layer of a thermoplastic polyolefin (TPO) material coupled with the EPDM material. The TPO material may have a thickness of between about 15 mils and 35 mils. The EPDM material and TPO material may be coupled via crosslinking of the TPO and EPDM material at an interface of the two materials. A top portion of the EPDM material may be cured via the application of heat after the EPDM material and TPO material are placed into contact so as to effect crosslinking of the materials and bonding thereof. In some embodiments, a fiber mat or film positioned between the TPO material sheet and the EPDM material sheet, or adjacent a bottom surface of the EPDM material.

According to another embodiment, a method of making a roofing membrane is provided. According to the method, an uncured ethylene propylene diene monomer rubber (EPDM) material sheet is provided and a thermoplastic polyolefin (TPO) material sheet is positioned atop the EPDM material sheet. The EPDM material sheet is heated and the EPDM material sheet and TPO material sheet are pressed together via one or more rollers. Heating the EPDM material sheet may cause at least a top portion of the EPDM material sheet to cure such that crosslinking of the TPO and EPDM material sheets occurs at an interface of the sheets to bond the sheets together.

In some embodiments, the EPDM material may be heated via heat from the TPO material sheet after the TPO material sheet is placed atop the EPDM material sheet. In other embodiments, the EPDM material may be heated via an infrared heat source, a robotic welder, or heated air.

BRIEF DESCRIPTION OF THE DRAWINGS

The present invention is described in conjunction with the appended figures.

Figure 1:
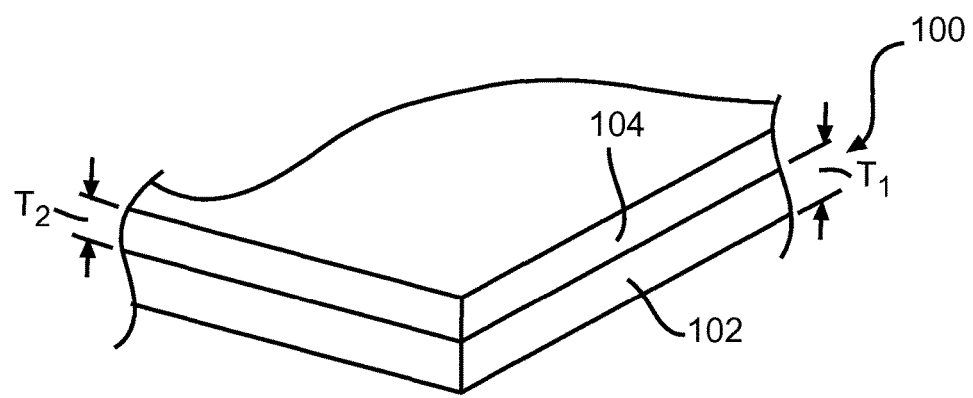
FIG. 1 illustrates a perspective view of a laminate having a top TPO material or layer laminated with a bottom EPDM material or layer according to an embodiment of the invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Some common terms that are used in describing embodiments of the invention are TPO or TPO membrane, EPDM or EPDM membrane, yarn, fiber filament or strand, butyl tape, scrim, film, and the like. The term TPO refers to thermoplastic olefin or polyolefin material, which is typically a polymer/filler blend that may include some portion of polypropylene, polyethylene, block copolymer polypropylene, rubber, and/or a filler material such as for reinforcement. The filler materials may include talc, fiberglass, carbon fiber, wollastonite, and the like. Various rubbers may also be used, such as ethylene propylene rubber, EPDM, styrene-ethylene-butadiene-styrene, and the like. The term EPDM refers to ethylene propylene diene monomer rubber, which is typically a type of synthetic rubber having a wide range of applications. In the embodiments described herein, the EPDM material is used as a roofing membrane that is applied atop a building or structure. In some embodiments, any white Thermoplastic Vulcanizate (TPV) may be used in place of or in addition to a TPO membrane.

The term fiber filament or strand refers to an individual segment or strand of a fiber material, which may be made of a polymer such as polyester. The term yarn refers to a length of interlocked fiber filaments or strands. The yarn may be relatively long and continuous.

The embodiments described herein provide a laminate that includes a TPO top material or layer and an EPDM bottom material or layer. The laminates described herein are typically used as roofing membranes and provide improved properties over conventional roofing membranes. In one embodiment, the top TPO material is a white TPO ply and the bottom EPDM material is a black ply. In other embodiments, a white EPDM material may replace the black ply. In comparison to a single roofing material or membrane of white EPDM, an advantage of the TPO top material and EPDM bottom material laminate is an improved ability of the laminate to remain white in addition to improved weathering stability. The black EPDM ply bottom material provides membrane flexibility and long term weathering stability. The white TPO top material provides UV protection and reduces heat island effects. The TPO material can also be heat welded to other TPO pieces or accessories which are cheaper to make than rubber accessories. The TPO material also allows other components or materials to be easily welded onto the roofing laminate. In some embodiments, since half of the laminate comprises a flexible EPDM membrane, the resulting laminate will have considerably more flexibility than existing TPO membranes.

In one embodiment, the TPO and EPDM materials are bonded or coupled together by crosslinking of the materials at an interface of the materials, or in other words, where a bottom surface of the TPO contacts a top surface of the EPDM. The EPDM material may be in an uncured state when the materials are placed in contact with each other to allow the crosslinking of the materials to occur. In one embodiment, the black EPDM ply is a slow cure EPDM, or includes a slow cure package, or in other words one or more fillers that cause the EPDM ply to cure at a slower rate compared with other EPDM materials. In such embodiments, when a hot TPO material contacts the black EPDM, the EPDM will not instantly be cured, which may otherwise prevent bonding to the TPO. In some embodiments, the slow cure EPDM may be cured on site after installation such as via solar radiation. In such embodiments, no autoclave is needed to cure the EPDM.

In some embodiments, a scrim or perforated polyester film can be inserted between the two plies (i.e., the TPO and EPDM materials or layers). Inserting a scrim or perforated polyester film may help avoid any high distortion from stretching during the installation process. This reinforcement may not only eliminate the distortion concern, but also prevent wrinkles that may be generated from the difference in expansion coefficient of the two different materials.

In some embodiments a fleece layer may be coupled with the bottom surface of the laminate. The uncured EPDM bottom ply material may allow a fleece layer to be laminated to the bottom surface since the rubber is not cured. In the uncured state, the rubber material can accept the fleece fibers and mechanically lock them in place when it subsequently cures. The fleece bottom layer may help the integrity of the membrane. It may also provide "fully adhere" capability, which may be good for refurbishing old roofs with a new and "white" roof.

Referring now to FIG. 1, illustrated is a laminate 100 having a top TPO material or layer 104 that is laminated with a bottom EPDM material or layer 102. As described herein, the top TPO material or layer may be a white material while the bottom EPDM material is a black material. In some embodiments, a white Thermoplastic Vulcanizate (TPV) material layer may be used in place of or in addition to TPO material or layer 104. The laminate 100 may be used as a roofing membrane and attached atop a building or structure. The laminate 100 may be relatively flexible due to the EPDM layer 102 and may have improved weathering and other properties when compared to conventional roofing membranes. For example, TPO materials generally do not degrade under solar UV radiation, thereby improving the weathering capability of the laminate 100. The laminate 100 may also reduce heat island effects due to the white TPO top layer 104 and/or be less expensive than similar conventional roofing membranes, such as solid white EPDM membranes.

The TPO material 104 may be laminated to the EPDM material 102 by heat. In one embodiment, the EPDM material 102 is not cured which allows the lamination of the materials to occur. The uncured EPDM material allows the TPO top material 104 and EPDM bottom material 102 to crosslink at the interface of the materials, or in other words, where the materials contact. Since the materials crosslink, the materials are tightly bonded together and rigidly held together. The bond between the materials is enhanced compared to other laminated roofing materials, which often require the use of other materials (e.g., silane additives), the application of high heat, and the like, which may deform one or more layers and introduce stresses to the laminate.

In one embodiment, heat from the TPO top material 104 may be used to effect or cause cross-linking of the materials, 102 and 104, by causing a top surface or portion of the EPDM bottom material 102 to cure. The remainder of the EPDM material 102 (i.e., anything below the top surface or layer) may remain uncured for a period of time after the cross-linking occurs, such as until after the laminate 100 is installed atop a building or structure. Stated differently, the top surface or portion of the EPDM material 102 may cure relatively quickly after the TPO material or layer 104 is applied while the remainder of the EPDM material 102 gradually cures over a period of time. Curing of the EPDM material 102 in this manner, and bonding of the layers 102 and 104, eliminates the need for an auto-clave to be used to cure the EPDM and bond the materials. Use of an auto-clave may melt and/or deform the TPO material since temperatures in excess of 150 or 160 degrees Celsius are commonly required to cure EPDM. The use of an auto-clave in this manner may introduce unwanted stresses into a resulting TPO/EPDM laminate and/or cause the laminate to vary in thickness and/or shape.

In one embodiment, the TPO material 104 may be extruded immediately or directly onto a surface of the uncured EPDM material 102. The TPO material 104 may be relatively hot since the material is extruded immediately or directly onto the EPDM 102. In some embodiments, the temperature of the TPO material 104 may be in excess of 150 degrees Celsius, and more commonly about 200 degrees Celsius, which is sufficiently high to cause the top surface of the EPDM 102, or a portion thereof, to rapidly cure. As described herein, the curing of the EPDM material may cause cross-linking between the EPDM and TPO layers, 102 and 104. The bottom portion and mid-section of the EPDM material 102 may remain uncured due to insufficient heat transfer through the material. In some embodiments a majority of the thickness of that EPDM layer 102 may remain uncured after the TPO and EPDM, 104 and 102, are bonded together.

Conventional laminates typically require or use a "cross-linkable" plastic, such as materials that require or use silane in both plies to bond the plies together with the help of moisture. In contrast, laminate 100 uses an uncured EPDM rubber compound with an extruded TPO plastic. As described herein, heat from the TPO will cure the surface of the uncured rubber but typically not the entire thickness. Stated differently, heat is used to interlock and crosslink the rubber and plastic materials.

Other conventional laminates may use rubber-like yet heat weldable plastic materials, such as Thermoplastic Vulcanizate (TPV). These materials are neither uncured rubber nor cured rubber and thus differ from those described in the embodiments herein, which are generally a plastic material laminated to an uncured rubber material. As described herein, in some embodiments the rubber materials may cure after lamination or on-site to become cured rubber.

Further, other conventional laminates may bond a TPO material to a cured EPDM. This is typically done by heating both sides of the TPO and cured EPDM to above 190 or 220 degrees Celsius to form the bond. The resulting bond, however, is typically weak at the interface. In addition, stresses that result from thermal shrinkage will often further weaken the bond. The embodiments described herein, which use mostly uncured rubber materials, are able to conform to any pre-strain during installation and/or re-adjust dimensionally to changes during slow curing. The resulting laminates are thus typically flat and seldom wrinkled. The TPO material 104 may also help strengthen the laminate 100, which will make the laminate 100 more stable than conventional laminates.

As described herein, the EPDM material 102 of laminate 100 typically will eventually cure, but the process is relatively slow. For example, in some embodiments, the curing process may take one to two months before the EPDM material 102 fully cures. In some embodiments, the curing process may be accelerated by the application of heat, which may be provided by solar radiation. For example, after the laminate 100 is applied atop a building or structure, some solar radiation may penetrate through the TPO top layer 104 and heat the EPDM bottom layer 102. The solar radiation may accelerate curing of the EPDM material 102.

The uncured EPDM material 102 typically exhibits more resiliency when compared to cured EPDM material. This allows the EPDM material 102 to resiliently return when it is pulled or stretched. It also allows the EPDM material 102 to conform to any pre-strain during installation and/or re-adjust dimensionally to changes during slow curing. Cured EPDM materials typically deform when pulled or stretched beyond a certain amount. In some embodiments, the TPO material layer 104, which is a plastic material that is stronger and less deformable than the EPDM material 102, may reinforce the laminate 100. For example, the TPO layer 104 allows strengthens the laminate 100 to allow a roofer to pull the laminate and easily position the laminate about a roof or other structure.

In some embodiments, the EPDM material 102 will gradually relax after installation of the laminate. The EPDM may then cure. The gradual relaxation of the EPDM may release or compensate for any stress that is built up during installation. This relaxation may greatly reduce potential wrinkles on the surface that would otherwise form as the different materials expand and shrink due to thermal changes and different thermal expansion coefficients, and/or greatly reduce stretching/extension from thermal changes and installation, which may otherwise deform or tear the laminate. The EPDM may also relax and yield to the TPO material, which is more rigid. For example, roofers may install the laminate and fasten it in place (e.g., via nails, screws, clips, and other fasteners). During this process, various stresses may be placed on the laminate. As the EPDM material relaxes and cures, however, the laminate may equalize to the stresses and thereby prevent future wrinkling, deforming, tearing, and/or other problems.

In some embodiments, the laminate 100 may have a thinner layer of the TPO material 104 and a thicker layer of the EPDM material 102 to provide an optimal balance of strength and flexibility. To achieve this balance, the thickness ratio of the EPDM material 102 to TPO material 104 may be between about 60/40 and 80/20 or approximately 70/30. In some embodiments, the EPDM material 102 may have a thickness $T_1$ of between about 50 and 70 mils (i.e., 0.050 and 0.070 inches) and the TPO material may have a thickness $T_2$ of between about 15 and 35 mils (i.e., 0.015 and 0.035 inches), which provides a thickness ratio within the above described ranges. In an exemplary embodiment, the EPDM material 102 may have a thickness $T_1$ of about 60 mils and the TPO material 104 may have a thickness $T_2$ of about 25 mils to provide an approximate thickness ratio of 70/30 EPDM to TPO. This ratio may maintain a flexural modulus of that is similar to black EPDM materials. In some embodiments, the laminate may have a hardness of about 65. In other embodiment, the EPDM material 102 may have a thickness $T_1$ as low as 25 mils to allow the laminate 100 to have a thickness ratio of roughly 50/50 EPDM to TPO material. In some embodiments, laminate 100 may have a total sheet thickness (i.e., combined thickness of the EPDM and TPO materials) of between about 70 and 100 mils or 80 and 90 mils. The individual thicknesses of each layer (i.e., the TPO and EPDM materials) may be varied to provide various TPO to EPDM material ratios and thickness so as to achieve a desired result such as increased flexibility, weldability, and the like.

In some embodiments, a fleece layer (not shown) may be coupled with the bottom surface of the laminate 100. The EPDM material 102 may allow a fleece layer to be laminated to the bottom surface since the EPDM material 102 is not cured. In the uncured state, the EPDM material 102 can accept the fleece fibers and mechanically lock them in place as it subsequently cures.

Figure 2:
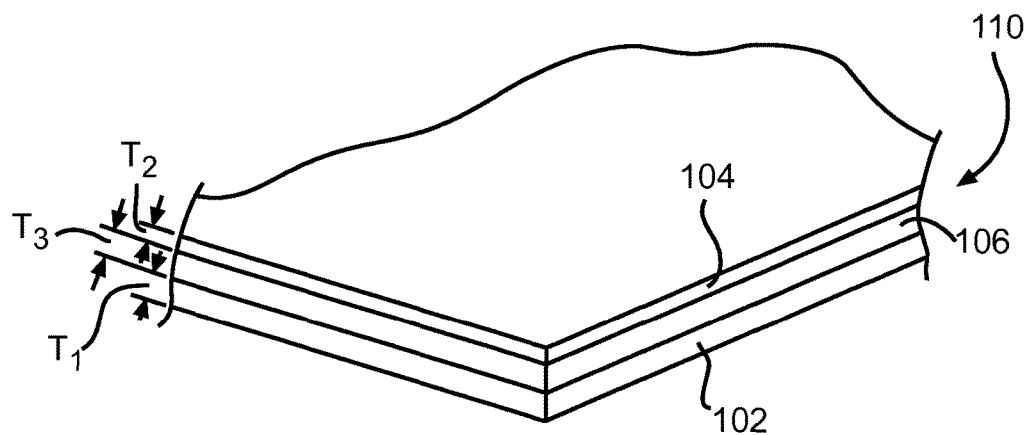
FIG. 2 illustrates another perspective view of a laminate having a top TPO layer and a bottom EPDM layer according to an embodiment of the invention.
Figure 3:
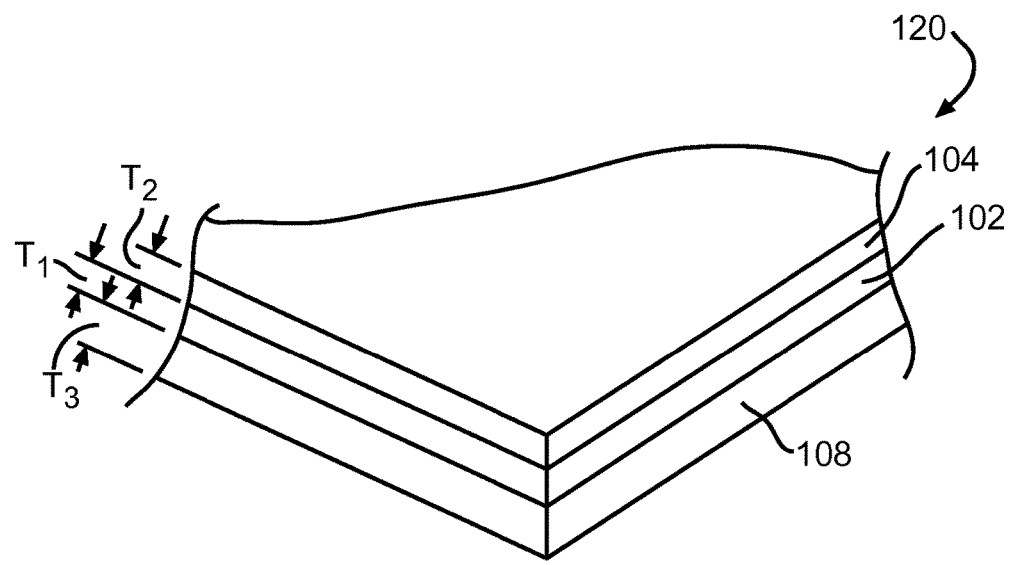
FIG. 3 illustrates another perspective view of a laminate having a top TPO layer and a bottom EPDM layer according to embodiments of the invention.
Figure 4:
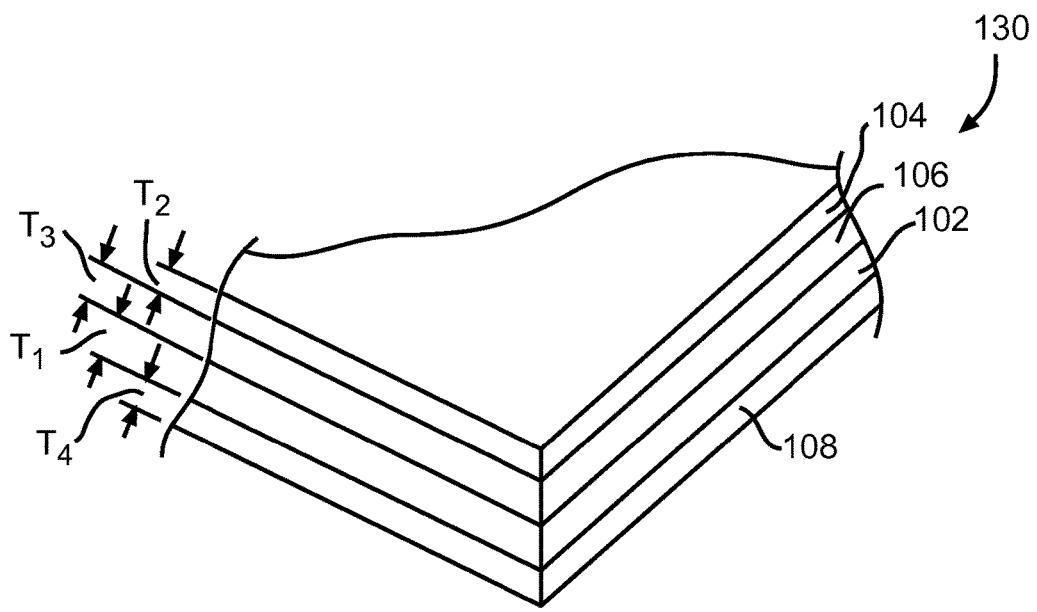
FIG. 4 illustrates another perspective view of a laminate having a top TPO layer and a bottom EPDM layer according to an embodiment of the invention.

Referring now to FIGS. 2-4, in some embodiments the laminate may include one or more additional layers of another material. For example, to further reinforce the laminate, a fiber scrim or film may be applied between the TPO and EPDM layers, or coupled with a surface of the EPDM layer opposite the TPO layer. The fiber scrim or film may greatly enhance the laminate's deformation resistance responsive to stretching and pulling from roofers during installation of the laminate. The fiber scrim or film may effectively take the majority of the stretching or pulling force so that the laminate is relatively unaffected. Without the fiber scrim or film, the potential for plastically deforming the laminate, or even tearing the laminate, is increased.

In some embodiments, the fiber scrim may be made of polymer yarns, such as polyester yarns. As described above, the yarns are typically lengths of interlocked fiber filaments or strands with the filaments or strands being individual segments of the fiber material. In some embodiments, the fiber scrims may be woven or nonwoven fiber mats. For example, the scrims may include multiple layers of fibers where the first layer includes fibers aligned in a first direction and the second layer includes fibers aligned in a second and often orthogonal direction. A tie yarn may be used to tie or couple adjacent yarns of the multiple layers together. Nonwoven mats may also be used where the fiber filaments, strands, or yarns are randomly oriented relative to one another and a binder is used to adhesively bond the fibers together. The films that may be used are typically a sheet of polymer material and are often perforated to allow the TPO and EPDM material to contact and crosslink.

FIG. 2 illustrates a laminate 110 that is similar to laminate 100 in that the laminate 110 includes a top TPO material layer 104 and a bottom EPDM material layer 102 that may have the thicknesses $T_1$ and $T_2$ described above. Inserted between the top TPO layer 104 and bottom EPDM layer 102 is a fiber scrim or film 106. The fiber scrim or film 106 may have a thicknesses $T_3$ of between about 3 and 7 mils (i.e., 0.003 and 0.007 inches), and more commonly about 5 mils. In some embodiments, as the TPO layer 104 and EPDM layer 102 are pressed together during lamination, the EPDM material may flow between the yarns and/or into the yarn between individual fiber strands. Upon curing, the fiber scrim 106 may be "locked" or rigidly coupled to the EPDM material layer 102 and to laminate 110.

FIG. 3 illustrates another laminate 120 that is similar to laminates 100 and 110 in that laminate 120 includes a TPO material layer 104 and an EPDM material layer 102 that may have the thicknesses $T_1$ and $T_2$ described above. Positioned adjacent a bottom surface of the EPDM material layer 102, and coupled therewith, is another material layer 108 having a thicknesses $T_3$. In some embodiments, layer 108 may be a fiber scrim or film, such as those described previously. In such embodiments, the EPDM material 102 may flow between and/or into the yarn of the fiber scrim during manufacture of the laminate 120. In such embodiments, the EPDM material 102 directly contacts the TPO material 104, which may promote increased crosslinking and coupling of the materials. In other embodiments, layer 108 may be an adhesive material layer that allows the laminate 120 to adhesively bond with other materials or objects, such as wood, concrete, and the like. This may allow the laminate 120 to be easily positioned atop a roof or other structure and coupled therewith. The adhesive material layer may include a removable film or membrane on a bottom surface that covers an adhesive that may be used to adhesively bond the laminate 120 with other materials or objects. The laminate 120 may be easily attached to other objects or materials by removing the membrane, positioning the laminate adjacent the object or material, and pressing the laminate 120 and adhesive material layer 108 against the object or material. In one embodiment, the adhesive material layer 108 comprises butyl tape.

FIG. 4 illustrates another laminate 130 that is similar to the laminates previously described in that laminate 130 includes a TPO material layer 104 and an EPDM material layer 102 that may have the thicknesses $T_1$ and $T_2$ described above. Positioned between the TPO layer 104 and EPDM layer 102 is a fiber scrim or film 106 having a thickness thicknesses $T_3$ as previously described. Positioned adjacent a bottom surface of EPDM layer 102 is an adhesive material layer 108, such as butyl tape, that may have a thickness $T_4$.

Figure 5:
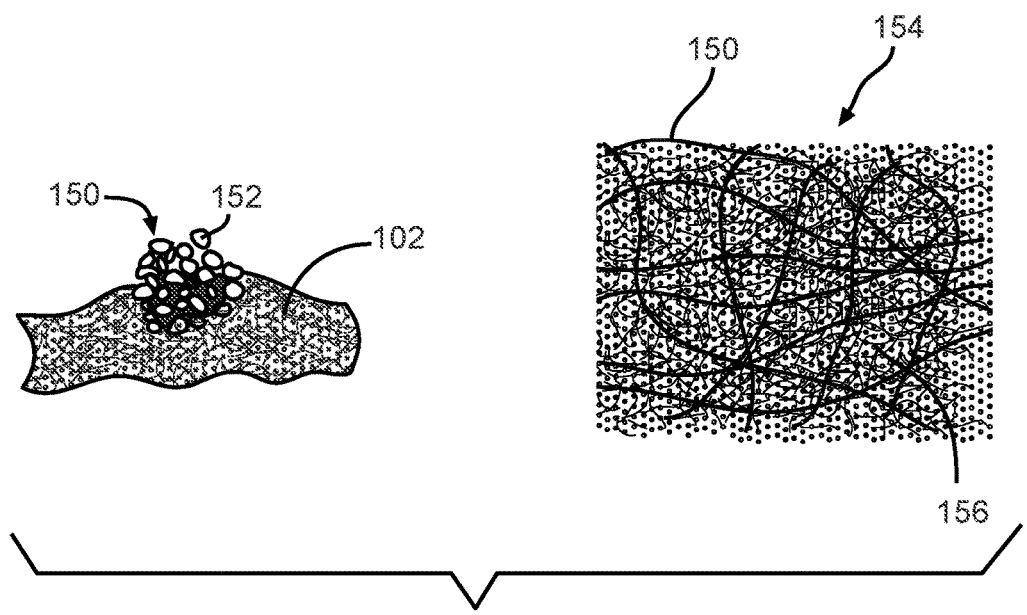
FIG. 5 illustrates a an example of how EPDM material may flow between the fiber strands, filaments, and/or yarn of the fiber scrim and/or into the yarn and between the individual fiber strands or filaments according to an embodiment of the invention.

Referring now to FIG. 5, illustrated is an example of how the EPDM material 102 may flow between the fiber strands, filaments, and/or yarns of the fiber scrim and/or into the yarns and between the individual fiber strands or filaments of the yarn. Specifically, the left hand figure shows a yarn 150 comprising a plurality of interlocked fiber filaments or strands 152. When the laminate is squeezed during manufacturing, the EPDM material 102 may flow into the yarn 150 and between the individual fiber strands 152. Subsequent curing and crosslinking of the EPDM material 102 will mechanical lock the yarn 150 in place relative to the EPDM material 102. Because the EPDM rubber is uncured, it is soft and can easily penetrate or squeeze into the yarn 150 and between the fiber strands 152. The right hand image of FIG. 5 shows a similar concept in that the EPDM material 102 may flow into openings 156 between the fiber strands, filaments, or yarns 150 of the fiber mat 154 and mechanically lock the mat 154 in place upon curing and crosslinking. In such embodiments, the yarns 150 and mats 154 essentially form or become a part of the EPDM layer.

In some embodiments, the laminates described herein may be used as flashing. In some embodiments, the TPO and EPDM layers may be thinner to allow the laminate to be stretchable by a roofer so that the laminate may be positioned and coupled on or around corners and/or in corners of the roof or structure.

Figure 6:
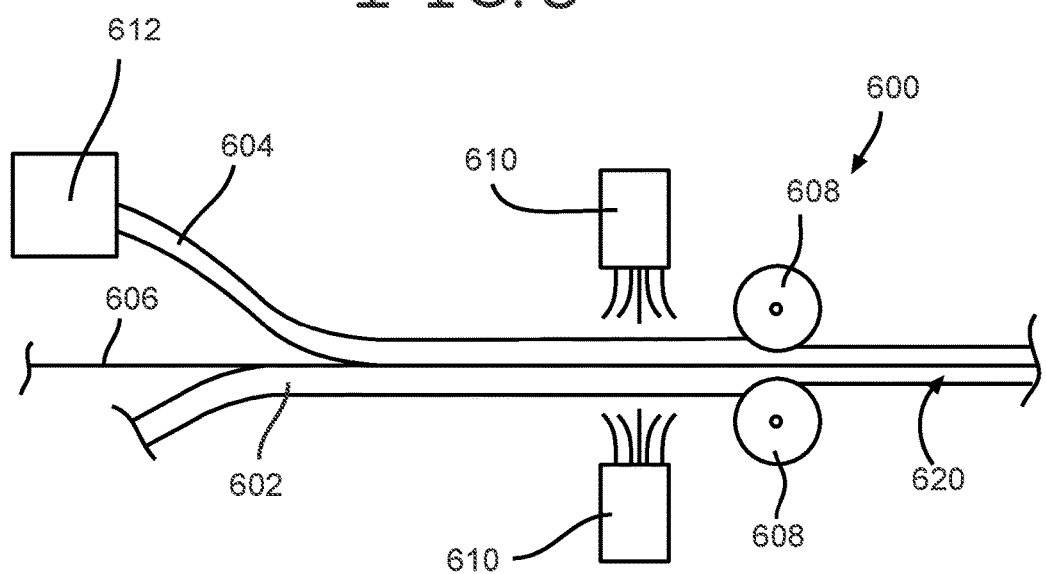
FIG. 6 illustrates a system for making a hybrid laminate according to an embodiment of the invention.

Referring now to FIG. 6, illustrated is a system 600 for manufacturing a hybrid laminate, such as any of those described herein. As shown, system 600 includes a pair of rollers 608 that are used to press an EPDM material layer 602 and a TPO material layer 604 together to form the hybrid laminate 620. In some embodiments, a scrim material layer 606 may be positioned between the EPDM material layer 602 and the TPO material layer 604, or adjacent a bottom surface of the EPDM material layer 602 as described herein. In some embodiments, the EPDM material layer 602, TPO material layer 604, and/or scrim material layer 606 may be fed into the rollers 608 from rolls. In such embodiments, the material layers, 602 and 604, will typically be relatively cold and, thus, need to be reheated to cause crosslinking of the TPO and EPDM materials. To reheat the layers, system 600 may include a pair of infrared ovens 610 that radiate the layers, robotic welder, or blowers that blow heated air onto the material layers, 602 and 604. In some embodiments, the ovens 610 heat the material layers to around 80 degrees Celsius or more to bond the material layers, 602 and 604, together. The heat is normally applied to the material surfaces that are pressed and bonded together.

In another embodiment, the TPO material 604 may be extruded from an extruder device 612 directly onto the EPDM material 602. In such embodiments, the TPO material may be sufficiently hot to cause the top surface of the EPDM material 602 to cure and cross link with the TPO material 604. In some embodiments, the TPO material 604 may be above 150 degrees Celsius, and more commonly about 200 degrees Celsius, which is sufficient to cause cure and crosslinking of the EPDM material 602. In such embodiments, the ovens 610 are not needed to heat the material layers, 602 and 604.

Figure 10:
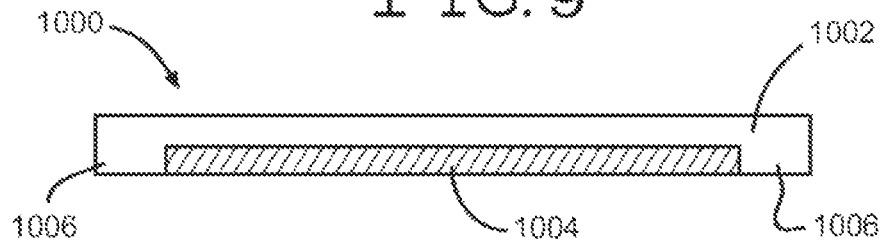
FIG. 10 illustrates another hybrid roofing membrane or laminate according to another embodiment of the invention.

Referring now to FIG. 10, illustrated is another embodiment of a hybrid roofing membrane or laminate 1000. Laminate 1000 includes an EPDM material bottom layer 1004 and a TPO top layer 1002 as previously described. TPO top layer, however, includes one or more edges 1006 that wrap around an edge portion of EPDM bottom layer 1002. In some embodiments, a bottom surface of the edges 1006 may be roughly planar with a bottom surface of EPDM bottom layer 1004. Such embodiments allow the TPO edge portions 1006 to be heat welded to another TPO material. For example, the bottom surface of the edge portions 1006 may be heat welded to a top surface of another TPO laminate or material. Similarly, the side surface of edge portions 1006 may be welded to an adjacent TPO laminate or material. Such embodiments simplify coupling of adjacent laminates since the TPO may easily be heated and welded together, unlike EPDM materials, which typically require taping adjacent materials together.

Figure 11:
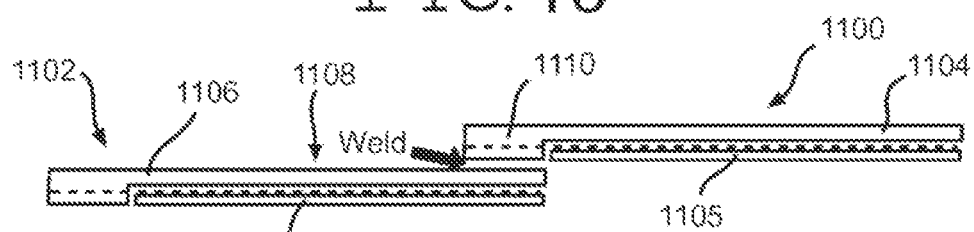
FIG. 11 illustrates a die for making the hybrid roofing membrane or laminate of FIG. 10 and/or FIG. 11 according to another embodiment of the invention.

FIG. 11 illustrates another embodiment of a a hybrid roofing membrane or laminate 1100. Laminate 1100 is similar to laminate 1000 in that it includes an EPDM bottom layer 1105 and a TPO top layer 1104. Laminate 1100 is different, however, in that it only includes a single edge portion 1110 that wraps around one edge of EPDM bottom layer 1105. FIG. 11 also illustrates a second hybrid laminate 1102 having a similar configuration to laminate 1100 and that is positioned underneath laminate 1100. As shown, edge portion 1110 of laminate 1100 may easily be welded to a top surface 1108 of TPO top layer 1106 of laminate 1102 to couple the laminate together. Such embodiments may be beneficial when the laminates are placed and/or coupled together in a shingle-type arrangement.

Figure 9:
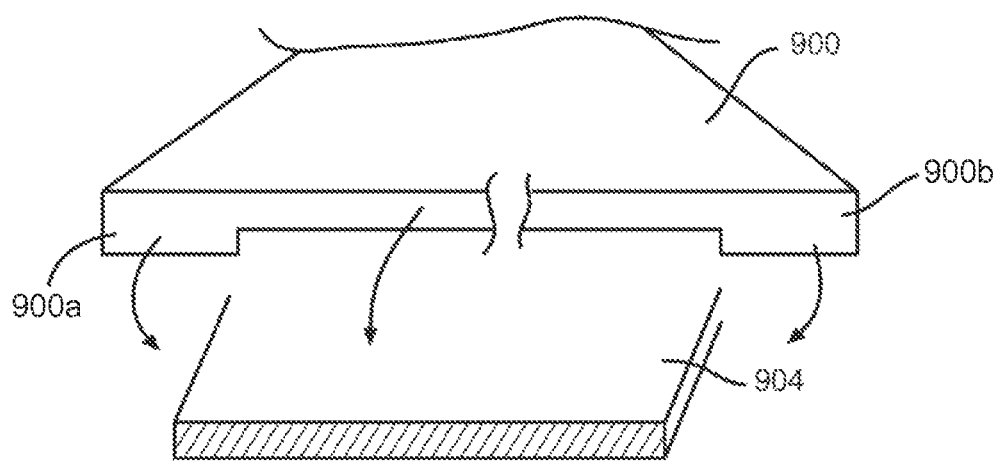
FIG. 9 illustrates another hybrid roofing membrane or laminate according to another embodiment of the invention.

FIG. 9 illustrates a die 900 that may be used to make the TPO laminates, 1000 and/or 1100, described above. Die 900 may have a shape that corresponds to the shape of the TPO laminate to be extruded (i.e., either laminate 1000 or laminate 1100). Specifically, die 900 may include one or more edge portions, 900a and 900b, that extend orthogonally from a central body or portion of die 900. In this manner, the extruded TPO laminate may have the edge portions that wrap around the EPDM bottom material. As shown, die 900 may be positioned over an uncured EPDM bottom layer 904 so that the TPO material is extruded directly onto the uncured EPDM material 904 as previously described. The heat of the extruded TPO material may cause a portion of the uncured EPDM material to cure and crosslink with the TPO material as previously described. The side portions of the uncured EPDM material may cure and crosslink with the edge portion of the TPO material in addition to the top surface of the EPDM material curing and crosslinking with the bottom surface of the TPO material.

Figure 7:
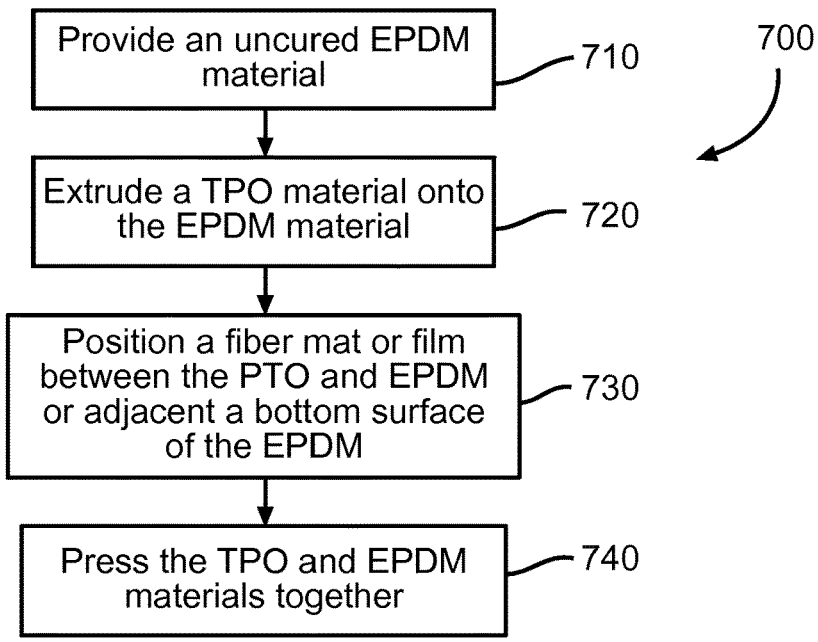
FIG. 7 illustrates a method of making a hybrid roofing membrane or laminate according to an embodiment of the invention.

Referring now to FIG. 7, illustrated is a method 700 of making a hybrid roofing membrane or laminate. At block 710, an ethylene propylene diene monomer rubber (EPDM) material sheet is provided. The EPDM material is uncured and may have a thickness of between about 50 mils and 70 mils. At block 720, a thermoplastic polyolefin (TPO) material sheet is extruded onto the EPDM material sheet. The extruded TPO sheet may have a temperature of at least 160 degrees Celsius, and more commonly about 200 degrees Celsius, and a thickness of between about 30 mils and 50 mils. At block 730, a fiber mat/scrim or film may optionally be positioned between the TPO material sheet and the EPDM material sheet or adjacent a bottom surface of the EPDM material sheet opposite the TPO material sheet. At block 740, the EPDM material sheet and TPO material sheet are pressed together via one or more rollers. The heat of the TPO material sheet may cause at least a top portion of the EPDM material sheet to cure such that crosslinking of the TPO and EPDM material sheets occurs at an interface of the sheets to bond the sheets together. In some embodiments, the EPDM and TPO sheets may be pressed together at a pressure between about 3.5 and 5 psi (lbs/in$^2$). The amount of pressure applied to the sheets may be temperature dependent. In some embodiments, higher temperatures of the extruded TPO may require the less pressure to bond the TPO to the EPDM materials.

In some embodiments, pressing the EPDM material sheet and TPO material sheet together via one or more rollers may cause the EPDM material to penetrate at least partially into yarn of the fiber mat/scrim and between fiber strands of the yarn. Subsequent curing and crosslinking of the EPDM material may mechanically locks the fiber mat/scrim into the EPDM material sheet.

In some embodiments, the EPDM material sheet may not fully cure for at least 1 to 2 months subsequent to bonding the EPDM and TPO sheets together. The EPDM material may be a slow cure EPDM material or have one or more filler materials that cause slow curing of the material. In some embodiments, an adhesive sheet material may be coupled with a surface of the EPDM material sheet opposite the interface of the EPDM and TPO sheets. The adhesive sheet material may have a removable membrane that covers an adhesive that allows the roofing membrane to be attached to other objects or materials by removing the membrane and pressing the adhesive sheet material against the other objects or materials. The adhesive sheet material may comprise butyl tape.

Figure 8:
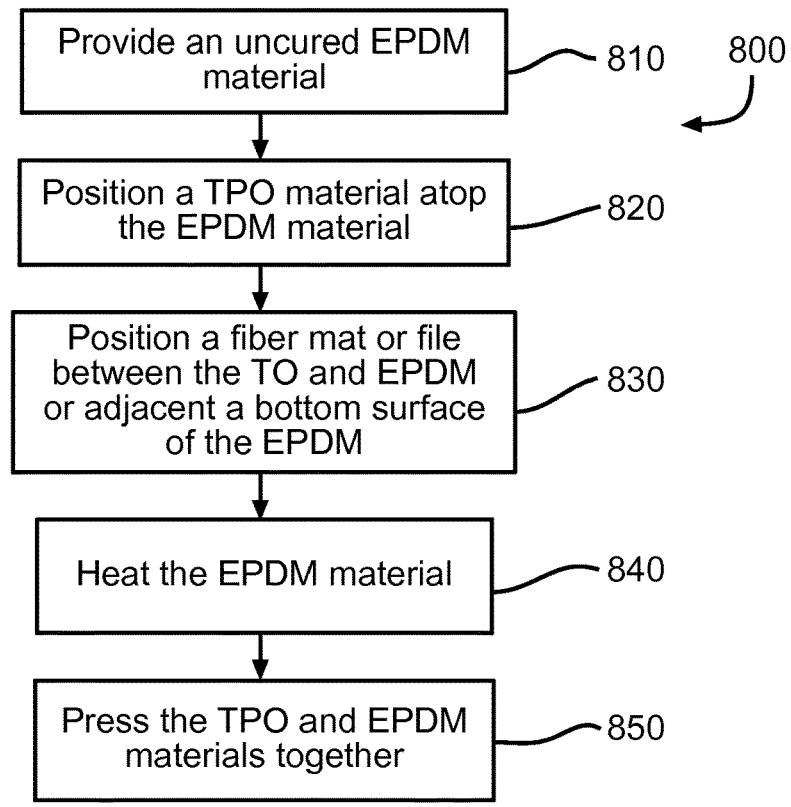
FIG. 8 illustrates another method of making a hybrid roofing membrane or laminate according to an embodiment of the invention.

Referring now to FIG. 8, illustrated is a method 800 of making a roofing membrane or laminate. At block 810, an uncured ethylene propylene diene monomer rubber (EPDM) material sheet is provided. At block 820, a thermoplastic polyolefin (TPO) material sheet is positioned atop the EPDM material sheet. At block 830, a fiber mat/scrim or film may optionally be positioned between the TPO material sheet and the EPDM material sheet or adjacent a bottom surface of the EPDM material sheet opposite the TPO material sheet. At block 840, the EPDM material sheet is heated. At block 850, the EPDM material sheet and TPO material sheet are pressed together via one or more rollers. Heating the EPDM material sheet causes at least a top portion of the EPDM material sheet to cure such that crosslinking of the TPO and EPDM material sheets occurs at an interface of the sheets to bond the sheets together. In some embodiments, the EPDM and TPO sheets may be pressed together at a pressure between about 3.5 and 5 psi (lbs/in$^2$).

In some embodiments, the EPDM material may be heated via heat from the TPO material sheet after the TPO material sheet is placed atop the EPDM material sheet, such as when the TPO material is extruded onto a surface of the EPDM material sheet. In other embodiments, the EPDM material may be heated via an infrared heat source, robotic welder, and/or heated air. In some embodiments, pressing the EPDM material sheet via the one or more rollers causes the EPDM material to penetrate at least partially into yarn of the fiber mat.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A roofing membrane laminate comprising:
   a first layer of an uncured ethylene propylene diene monomer rubber (EPDM) material, the EPDM material thickness of between about 50 mils and 70 mils;
   a second layer of a thermoplastic polyolefin (TPO) material coupled with the EPDM material, the TPO material having a thickness of between about 15 mils and 35 mils;
   a fleece layer coupled with a surface of the EPDM material opposite an interface of the EPDM and TPO materials such that fibers of the fleece layer are accepted within the EPDM material such that the fibers of the fleece layer are mechanically locked into the EPDM material; and
   a fiber mat or film positioned between the TPO material and the EPDM material;
   wherein:
      the EPDM material penetrates at least partially into yarn of the fiber mat and between fiber strands of the yarn such that the fiber mat is locked to the EPDM material and such that the EPDM material directly contacts the TPO material;
      the EPDM material and TPO material are coupled via crosslinking of the TPO and EPDM material at the interface thereof;
      at least a top portion of the EPDM material is cured via the application of heat after the EPDM material and TPO material are placed into contact so as to effect crosslinking of the materials;
      at least some of the first layer remains uncured prior to installation of the roofing membrane laminate; and
      the EPDM material is configured to fully cure when exposed to solar radiation.

2. The roofing membrane laminate of claim 1, wherein the EPDM material comprises a slow cure EPDM material.

3. The roofing membrane laminate of claim 1, wherein the fiber mat has a thickness of between about 0.003 and 0.007 inches.

4. A roofing membrane laminate comprising:
   a first layer of an uncured ethylene propylene diene monomer rubber (EPDM) material, the EPDM material thickness of between about 50 mils and 70 mils; and
   a second layer of a thermoplastic polyolefin (TPO) material coupled with the EPDM material, the TPO material having a thickness of between about 15 mils and 35 mils;
   wherein:
      the second layer comprises at least one edge that wraps around an edge portion of the first layer such that a bottom surface of the at least one edge is substantially planar with a bottom surface of the first layer;
      the EPDM material and TPO material are coupled via crosslinking of the TPO and EPDM material at an interface thereof; and
      at least a top portion of the EPDM material is cured via the application of heat after the EPDM material and TPO material are placed into contact so as to effect crosslinking of the materials.

5. The roofing membrane laminate of claim 4, further comprising a fiber mat or film coupled with a surface of the EPDM material opposite the interface of the EPDM and TPO materials.

6. The roofing membrane laminate of claim 5, wherein the EPDM material penetrates at least partially into yarn of the fiber mat to lock the fiber mat and EPDM material together.

7. The roofing membrane laminate of claim 4, further comprising an adhesive sheet material coupled with a surface of the EPDM material opposite the interface of the EPDM and TPO materials, the adhesive sheet material having a removable membrane covering an adhesive so as to allow the roofing membrane laminate to be attached to other objects or materials by removing the membrane and pressing the adhesive sheet material against the other objects or materials.

8. The roofing membrane laminate of claim 4, wherein the fiber mat has a thickness of between about 0.003 and 0.007 inches.

* * * * *